United States Patent

Ferris et al.

[15] 3,665,671
[45] May 30, 1972

[54] METHOD OF ERECTING STORAGE STRUCTURES

[72] Inventors: Robert G. Ferris, Harvard, Ill.; Howard J. Ferris, Gulfport, Fla.

[73] Assignee: Starline, Inc.

[22] Filed: July 2, 1970

[21] Appl. No.: 52,049

Related U.S. Application Data

[62] Division of Ser. No. 684,366, Nov. 20, 1967, Pat. No. 3,536,628.

[52] U.S. Cl. ................................................52/747, 220/5 A
[51] Int. Cl. .........................................E04g 23/06, B65d 7/00
[58] Field of Search ........................52/2, 108, 747; 160/243; 220/1 B, 5 A

[56] References Cited

UNITED STATES PATENTS 3,256,895  6/1966  Duquette ........................................52/2

FOREIGN PATENTS OR APPLICATIONS 14,957  8/1895  Great Britain ..........................160/243
634,900  7/1963  Belgium ...................................160/243

Primary Examiner—Frank L. Abbott
Assistant Examiner—James L. Ridgill, Jr.
Attorney—Hofgren, Wegner, Allen, Stellman & McCord

[57] ABSTRACT

A method of erecting a permanent silo structure including the steps of assembling a plurality of transversely precurved, coiled wall members around the perimeter of a base, with the free ends of the wall members extending vertically upwardly and terminating in a common horizontal plane; inserting filler members between each of the wall members to create a sealed structure; assembling a roof to the free ends of the wall members; incrementally applying an upward force to unroll the coiled wall members to elevate the structure; and securing compressive members in vertically spaced positions around the perimeter of the wall members and filler members after each increment of upward force is applied.

12 Claims, 37 Drawing Figures

Patented May 30, 1972
3,665,671
9 Sheets-Sheet 1
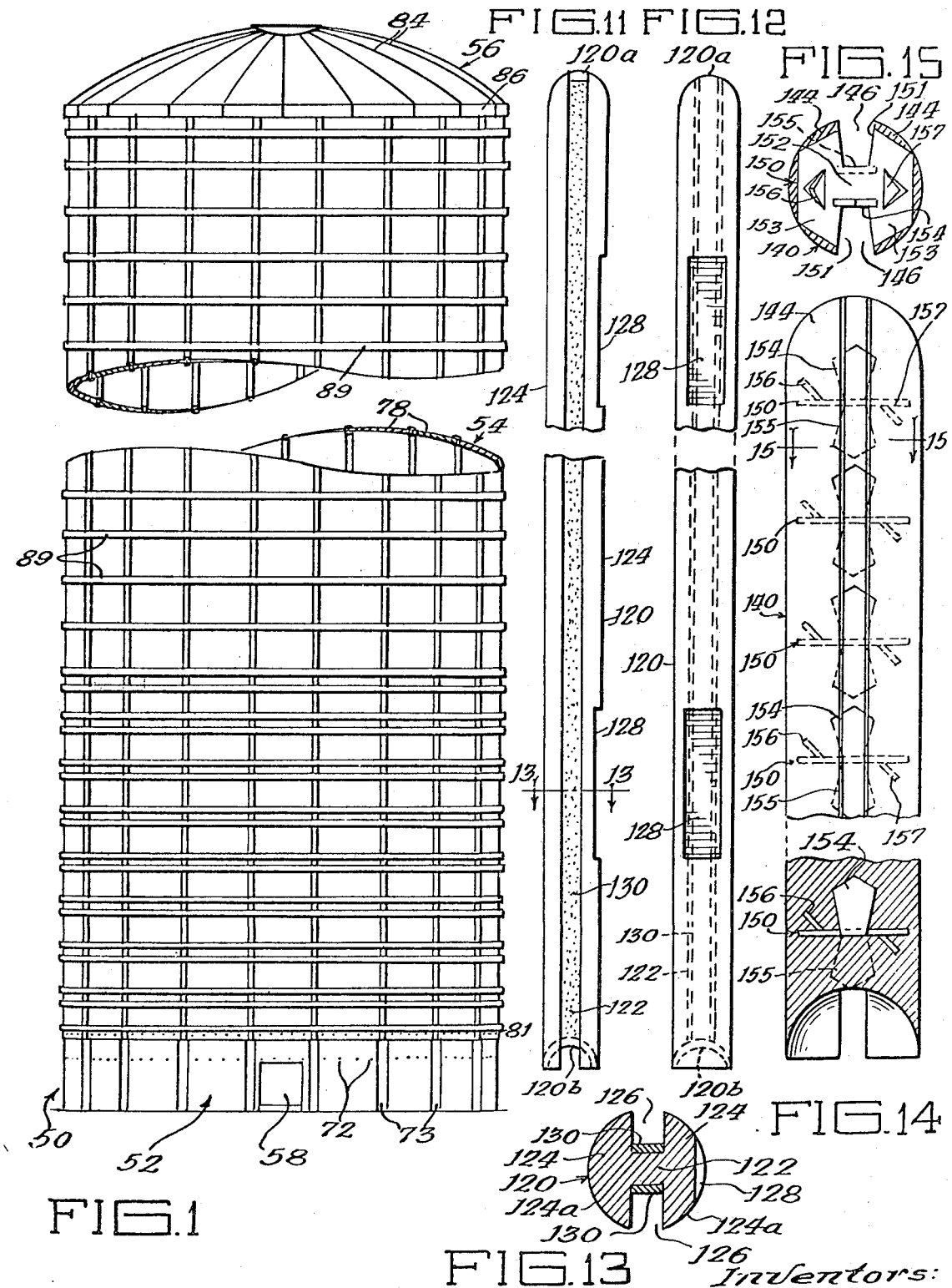
Inventors:
Robert G. Ferris
Howard J. Ferris
By: Hofgren, Wegner, Allen, Stellman & McCord
Attorneys Patented May 30, 1972 3,665,671
9 Sheets-Sheet 2
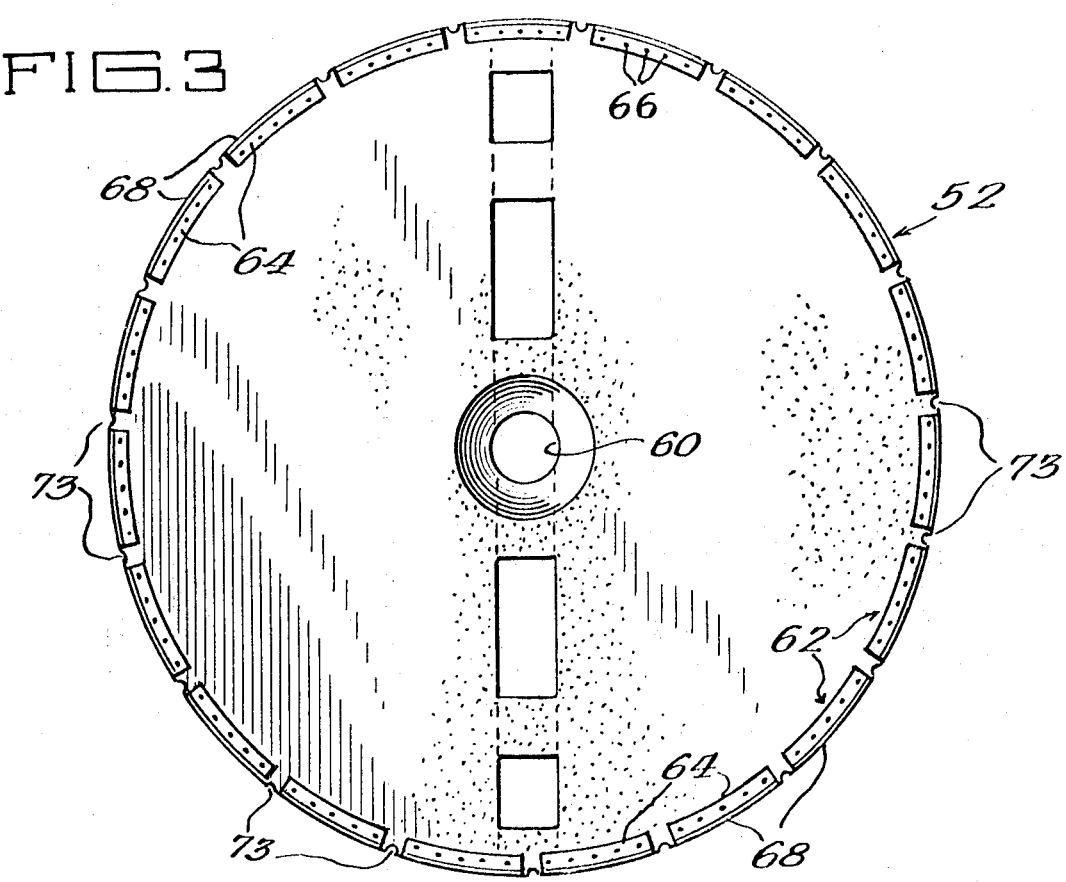
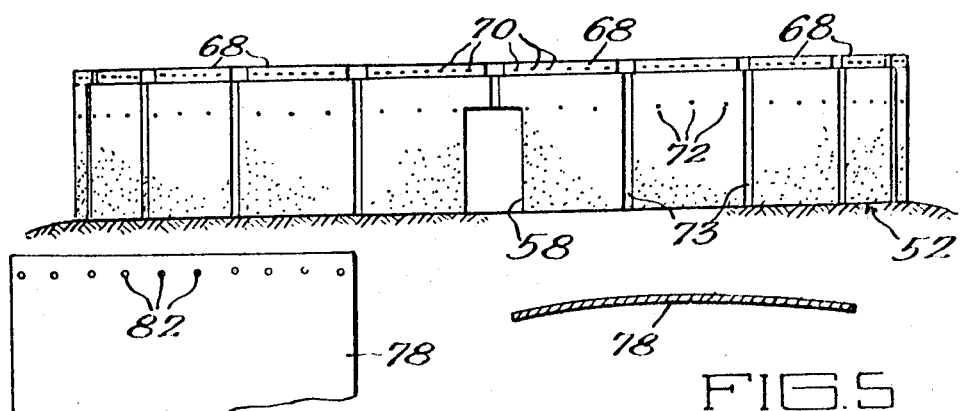
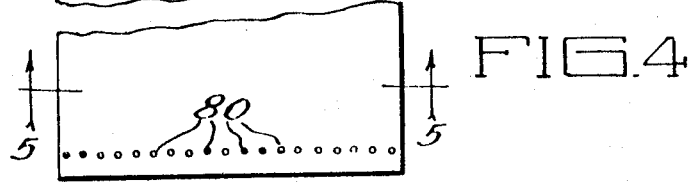

FIG. 9
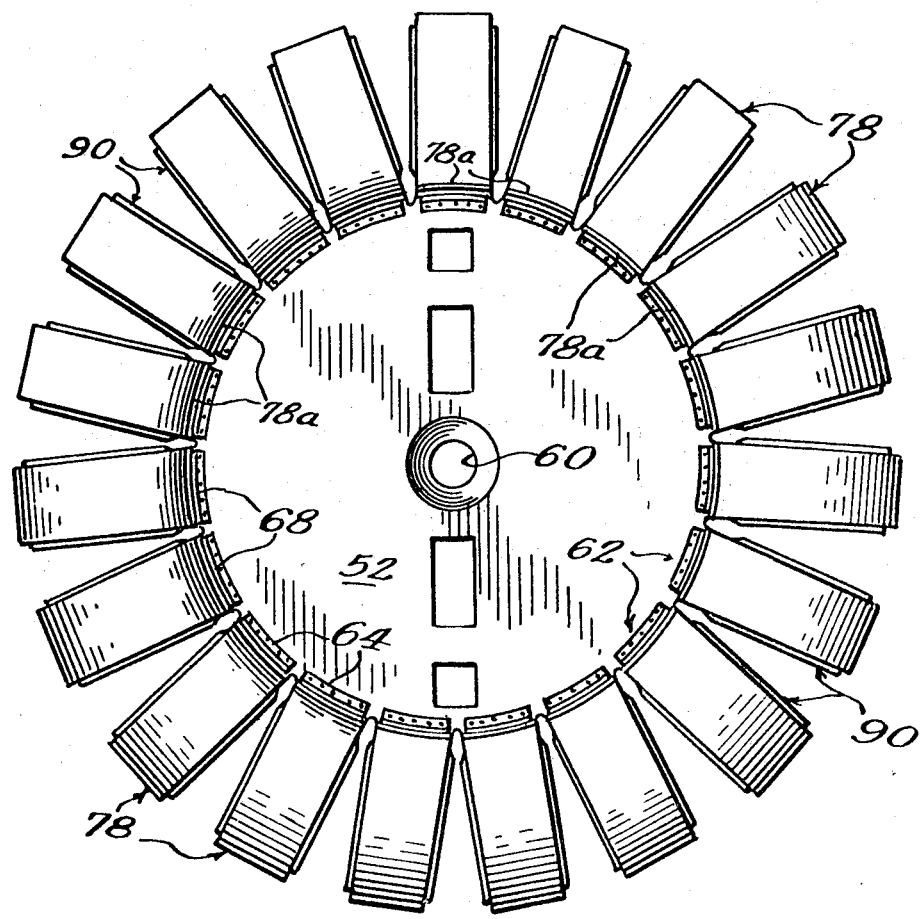
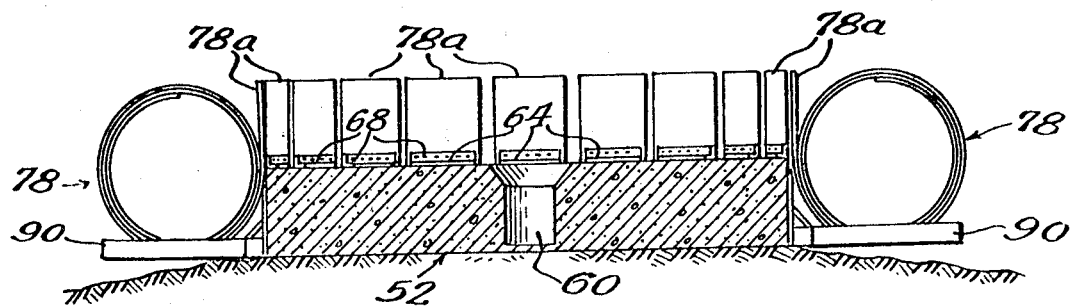
FIG. 8

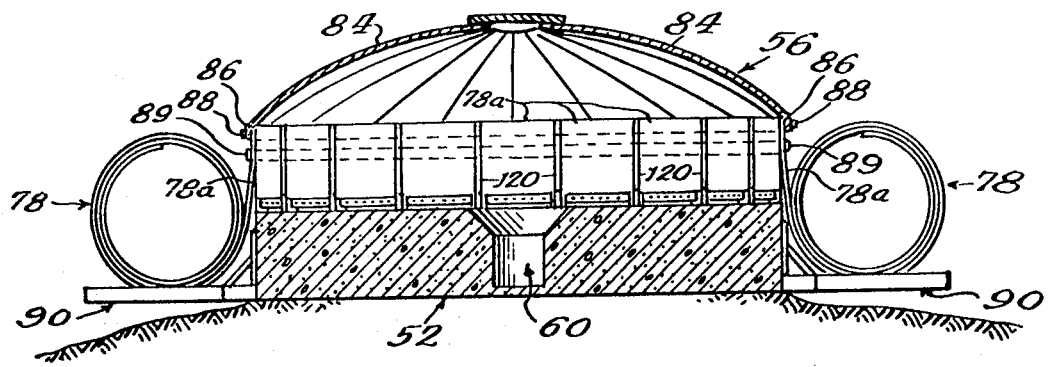
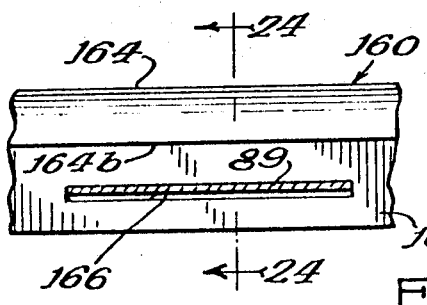
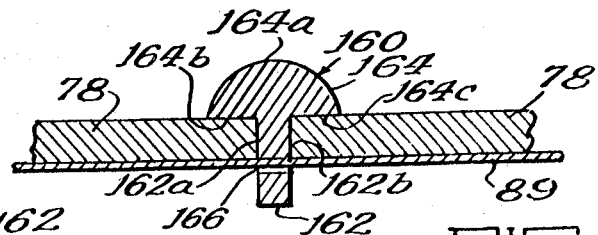
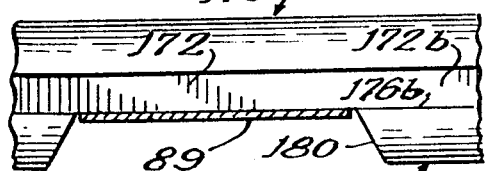
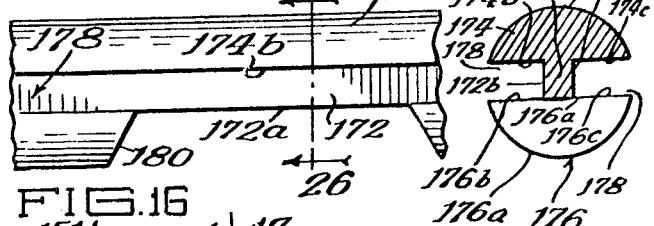
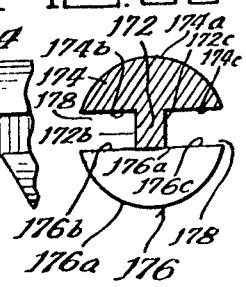
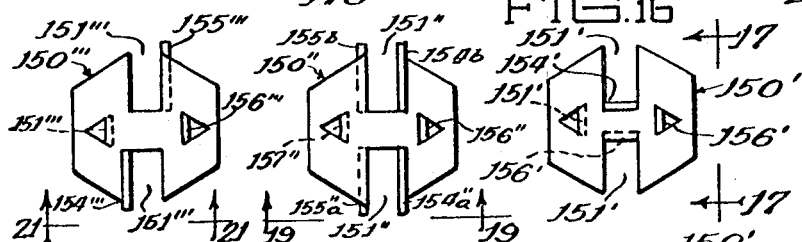
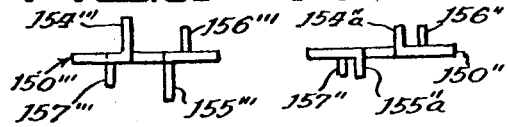
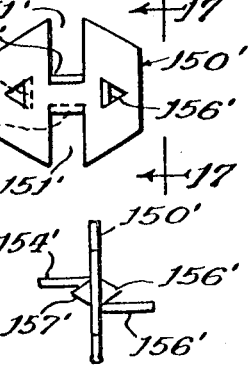
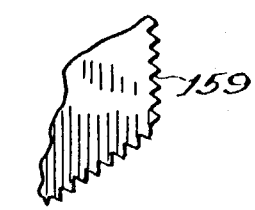

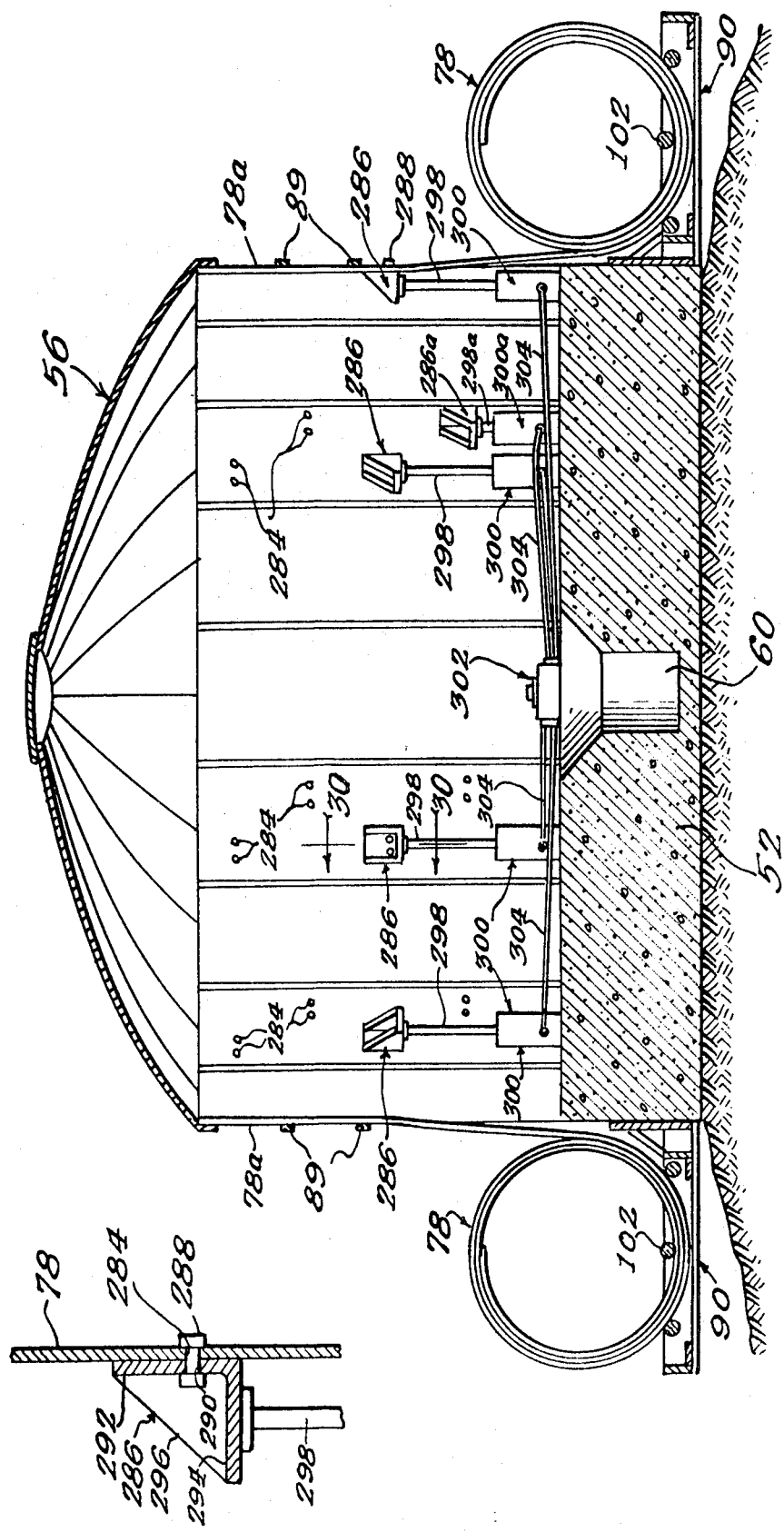

Patented May 30, 1972 3,665,671

Patented May 30, 1972
3,665,671
9 Sheets-Sheet 9
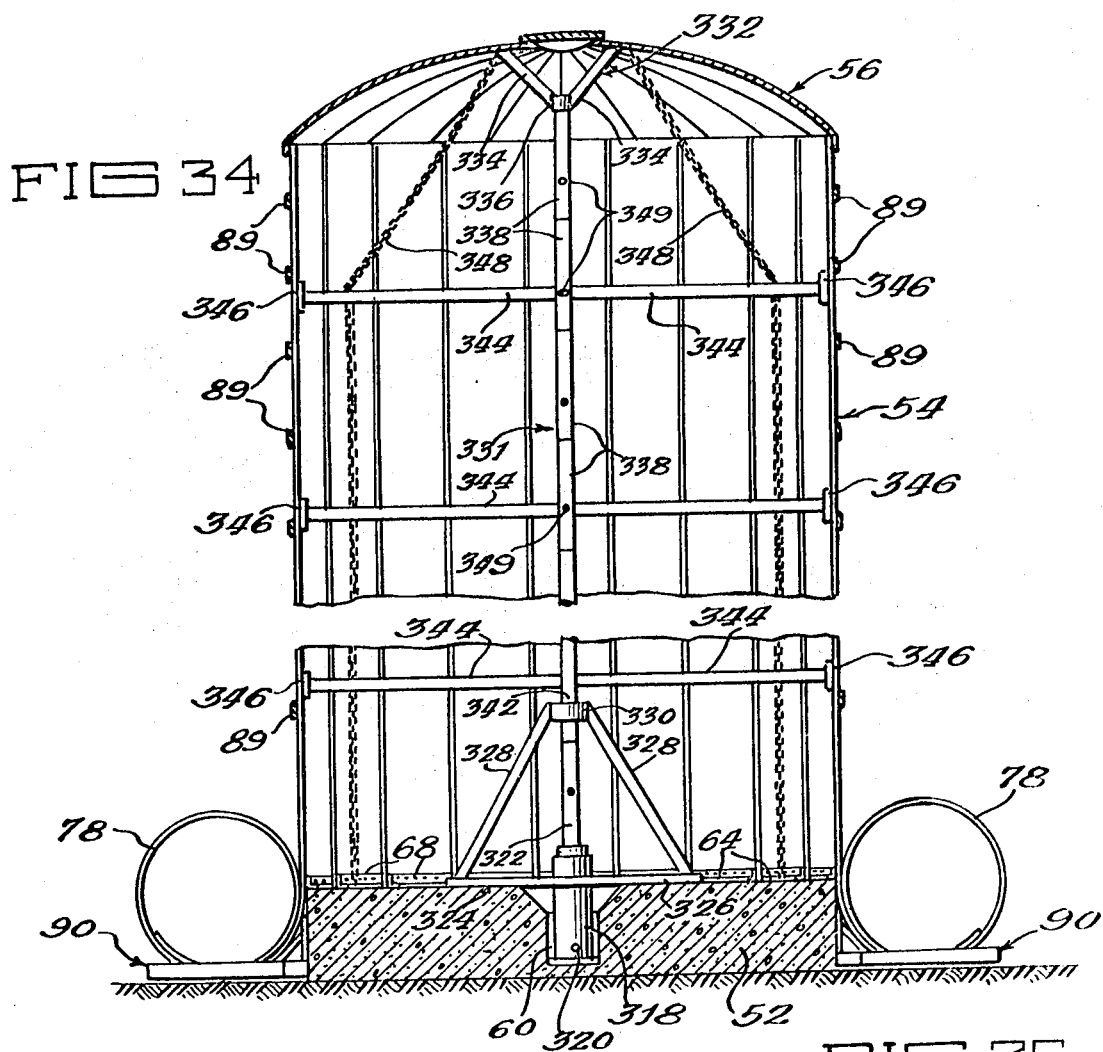
FIG 34
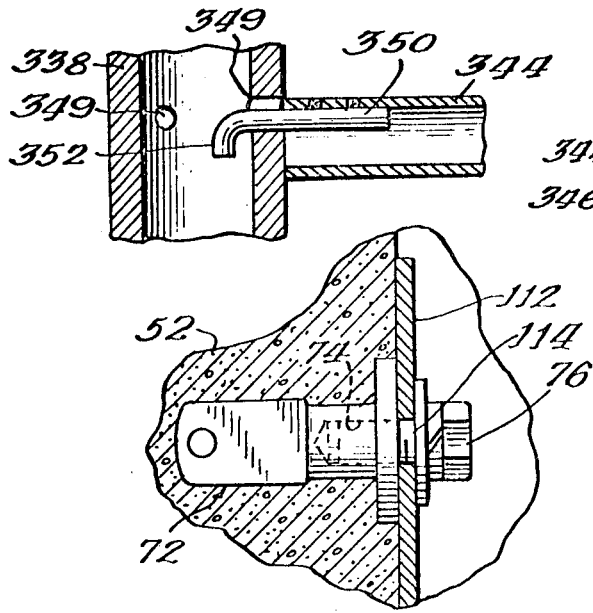
FIG 35
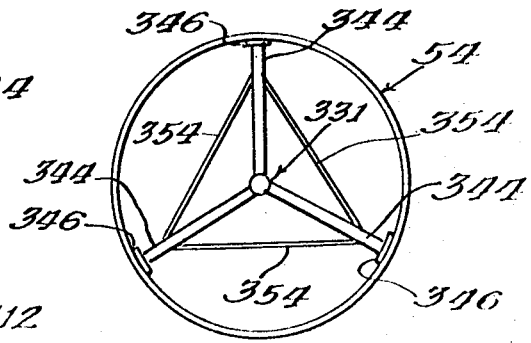
FIG 36
FIG. 37

METHOD OF ERECTING STORAGE STRUCTURES

CROSS REFERENCE TO RELATED APPLICATIONS

This application is a division of our copending application 684,366, filed Nov. 20, 1967, and issued Sept. 29, 1970, as U.S. Pat. No. 3,536,628.

BACKGROUND OF THE INVENTION

In the past, silo type structures for storage of flowable material have been formed from many different materials and by many different methods. For example, it has been known to form silos of steel; stone; mortar; wood staves; tile; bricks; poured in place concrete; concrete staves; steel coated with zinc, glass, or epoxy resins; and plastic reinforced with glass fibers. The methods of constructing silage storage structures from the above materials are as diverse as the materials themselves.

One of the earliest forms of silage storage structure was formed of field stone and mortar, and this construction not only required an excessive amount of labor to erect, but also the resulting structures were limited to small diameters and were very weak against pressure. Furthermore, the heights of such structures were quite limited, as they had to be hand filled and emptied. Such structures also required internal staging during erection, and all material had to be elevated to the top of the structure. Resistance to silage acids was poor, and because of the many problems inherent in such structures, they are no longer in use.

Wood stave silage storage structures commonly used staves 20 ft. long, which included mating tongues and grooves along opposite edges of the staves to assemble them to one another. Circumferential hoops usually surrounded the staves to maintain the integrity of the resulting wall structure. Wood stave structures required external staging during erection, and it was difficult to erect a wall structure more than one stave high at a time, because of wind problems and the difficulty of handling the long staves. Corrosion resistance of such structures was fair, but they were extremely weak when empty, due to swelling and shrinking which was more pronounced as the diameter of the structure increased. Wood roofs added to the problems inherent in wood stave structures, and because of the many deficiencies of such structures, they are no longer used.

Silage storage structures formed of bricks, concrete or tile block, bonded together with mortar and including buried hoops, were generally erected with internal staging to hoist all materials to the top of the structure during construction. Such structures usually included wood or metal roofs, and it was found that such structures were weak against hydrostatic pressure, resulting in leakage, frost damage and corrosion problems. In view of these problems, such structures have also effectively disappeared from the scene.

Poured in place concrete silos using slip forms with buried reinforcing hoops are in common use today, and such a construction is particularly used in silos of large diameters and height. By proper selection of aggregates, structures having adequate wall strength are produced, but such a construction requires a much greater amount of material than that used in any other construction. Usually such structures are provided with a poured concrete roof and internal staging is usually utilized to hoist all materials to the different levels of the slip forms.

Concrete precast stave silos with external reinforcing hoops have been the most popular in the recent past for structures of large diameter and height. Such structures have been substantially liquid tight and have shown good corrosion resistance, particularly when the interior of the structure is epoxy coated. With this type of structure, internal staging is required and all materials are hoisted to the work level. Concrete stave silos have commonly used roof structures formed of metal, or plastic reinforced with glass fibers, assembled and secured from the internal staging. The weight of concrete stave silos is substantial, and is approximately three and one-half times that of a comparable steel silo, although the weight is somewhat less than a poured-in-place concrete silo. For example, a silo 24 ft. in diameter × 70 ft. high has approximately 2,400 staves, each 30 inches × 10 inches × 3 ⅝ inches and weighing approximately 75 lbs., with the entire structure weighing in the neighborhood of 280,000 lbs. Ancillary parts, including hoops, fasteners and the roof structure, will increase the total weight by an additional 5,000–6,000 lbs. Such structures are extremely difficult and costly to assemble, and it has been found that it takes a team of four men working 7 hours a day approximately 12 days to complete the assembly of a concrete stave silo.

Steel silos, formed of a plurality of flanged sheets approximately 2 feet × 3 feet in size bolted to one another through the flanges, are in use today, and although such structures were originally galvanized, today they are conventionally epoxy coated for improved corrosion resistance. Such structures are characterized by extremely high fabrication and erection costs, because a typical 24 ft. diameter × 70 ft. high structure requires about 15,000 fasteners.

Silos formed of a plurality of overlapped and bolted glass coated steel sheets are also well known and in common use, and although corrosion resistance is good with such steel structures, their cost is also extremely high. For example, in a 24 ft. diameter × 70 ft. high structure, approximately 162 4 ft. × 8 ft. sheets are required weighing approximately 46,800 lbs., necessitating the use of around 7,000 fasteners. While such steel structures provide excellent storage, their assembly costs are undesirably high. For example, it has been found that 8 to 9 days are required for a team of five men to assemble such a silo. Erection of such structures has also proven to be troublesome, in that the conventional method of assembling the roof structure to the top row of sheets on the ground and then elevating the structure as each succeeding row of sheets is assembled, has proven to be difficult to control.

It has also been proposed to form silos of aluminum or plastic reinforced with glass fibers by the method described in the preceding paragraph, but these structures have the same inherent disadvantages and their only advantage is in weight reduction.

SUMMARY OF THE INVENTION

The present invention comprehends a method of constructing a structure including a wall defined by a plurality of staves each of which has a length substantially equal to the height of the building, with each stave precurved and rolled into an easily transportable coil so that all the coils may be mounted upon a structure base and unrolled simultaneously. Filler members are secured between adjacent staves to provide a sealed structure. The filler members may also be coiled in lengths equal to the height of the building; or may be in short lengths that are inserted end to end between the staves. A roof structure preferably is assembled to the staves before unrolling of the staves begins, and compressive members are secured around the wall structure at vertically spaced positions as the staves and filler members are elevated.

The above method, and storage structures erected thereby, have many advantageous features not present in prior art methods and constructions; and thus one of the principal objects of the invention is to provide a novel structure and method of constructing the same which will have an original material cost equal to or less than structures of the prior art, and a construction cost considerably less than structures of the prior art. Accordingly, it is a further object of the invention to provide a structure and method wherein the construction elements are designed so as to take advantage of relatively sophisticated fabrication equipment, whereby a majority of the elements can be prefabricated at a single plant to minimize per unit cost.

Another object of the invention is to provide a storage structure which significantly reduces the number of different pieces, and which maximizes the size of the wall staves or sheets to minimize the number of handling and fastening operations during erection.

Still another object of the invention is to design the components of a storage structure so that they are compact and light in weight, with all of the elements of a 24 ft. diameter × 70 ft. high silo being transportable to an erection site on two semi-trailer trucks.

Still another object of the invention is to greatly reduce the number of fasteners required during assembly, and to provide an arrangement where substantially all of the manual labor may be done at ground level.

Flowable material is used in the present application to define broadly any liquid or particulate solid material the characteristics of which are such that it may flow; even though, in the case of such flowable materials as silage, the material is sufficiently gummy that it does not flow freely and may actually need to be mechanically moved under certain conditions. It is apparent that the present disclosure is applicable to storage structures for liquids, free-flowing granular or particulate solids, and relatively sticky chopped or comminuted materials such as silage.

Other objects and advantages of the invention will hereinafter become more fully apparent from the following description taken in connection with the annexed drawings, wherein:

FIG. 1 is a broken, side elevational view of a silo constructed in accordance with the method of the present invention;

FIG. 2 is an enlarged side elevational view of the base of the silo prior to assembly of the side wall staves thereto;

FIG. 3 is a top plan view of the base illustrated in FIG. 2;

FIG. 4 is an enlarged, broken side elevational view of a side wall stave member prior to coiling of the same;

FIG. 5 is a cross sectional view taken generally along line 5—5 of FIG. 4;

FIG. 8 is a central sectional view on a reduced scale through the base of the silo, with the coil cradles assembled around the periphery thereof;

FIG. 9 is a top plan view of the structure illustrated in FIG. 8;

FIG. 10 is a central sectional view similar to FIG. 8, with the roof structure assembled to the upper ends of the side wall stave members;

FIG. 11 (on sheet with FIG. 1) is an enlarged, broken side elevational view of a filler member that is adapted to be inserted between adjacent side wall stave members;

FIG. 12 (on sheet with FIG. 1) is a broken front elevational view of the filler member illustrated in FIG. 11;

FIG. 13 (on sheet with FIG. 1) is a sectional view taken generally along line 13—13 of FIG. 11;

FIG. 14 (on sheet with FIG. 1) is an enlarged, broken side elevational view of a modified form of filler member;

FIG. 15 (on sheet with FIG. 1) is a cross sectional view taken generally along line 15—15 of FIG. 14;

FIG. 16 (on sheet with FIG. 10) is a plan view of a modified form of insert member usable in a filler member such as that illustrated in FIG. 14;

FIG. 17 (on sheet with FIG. 10) is a side elevational view taken along line 17—17 of FIG. 16;

FIG. 18 (on sheet with FIG. 10) is a plan view of a still further modified form of insert member;

FIG. 19 (on sheet with FIG. 10) is a side elevational view taken along line 19—19 of FIG. 18;

FIG. 20 (on sheet with FIG. 10) is a plan view of another form of insert member;

FIG. 21 (on sheet with FIG. 10) is a side elevational view taken along line 21—21 of FIG. 20;

FIG. 22 (on sheet with FIG. 10) is an enlarged, fragmentary plan view of an edge portion of a filler member, which modification may be employed with any of the above illustrated filler members;

FIG. 23 (on sheet with FIG. 10) is an enlarged, fragmentary side elevational view of a modified form of filler member;

FIG. 24 (on sheet with FIG. 10) is a sectional view taken generally along line 24—24 of FIG. 23;

FIG. 25 (on sheet with FIG. 10) is an enlarged fragmentary side elevational view of still another form of filler member;

FIG. 26 (on sheet with FIG. 10) is a sectional view taken generally along line 26—26 of FIG. 25;

FIG. 29 is an enlarged central sectional view through a silo structure with the angle members omitted for clarity, and illustrating a second method of elevating the side wall staves;

FIG. 30 is an enlarged sectional view taken generally along line 30—30 of FIG. 29;

FIG. 34 is a central sectional view through a partially elevated silo structure, and illustrating a further method for elevating the side wall structure of the silo;

FIG. 35 is an enlarged, fragmentary sectional view of the structure for assembling cross-braces to an upright in the apparatus used in connection with the method illustrated in FIG. 34;

FIG. 36 is a plan view on a reduced scale of the bracing structure used in connection with the method illustrated in FIG. 34; and FIG. 37 is an enlarged cross sectional view showing an illustrative means of temporarily securing the coil cradles to the base of the silo structure.

DESCRIPTION OF THE PREFERRED EMBODIMENT

Figure 6:
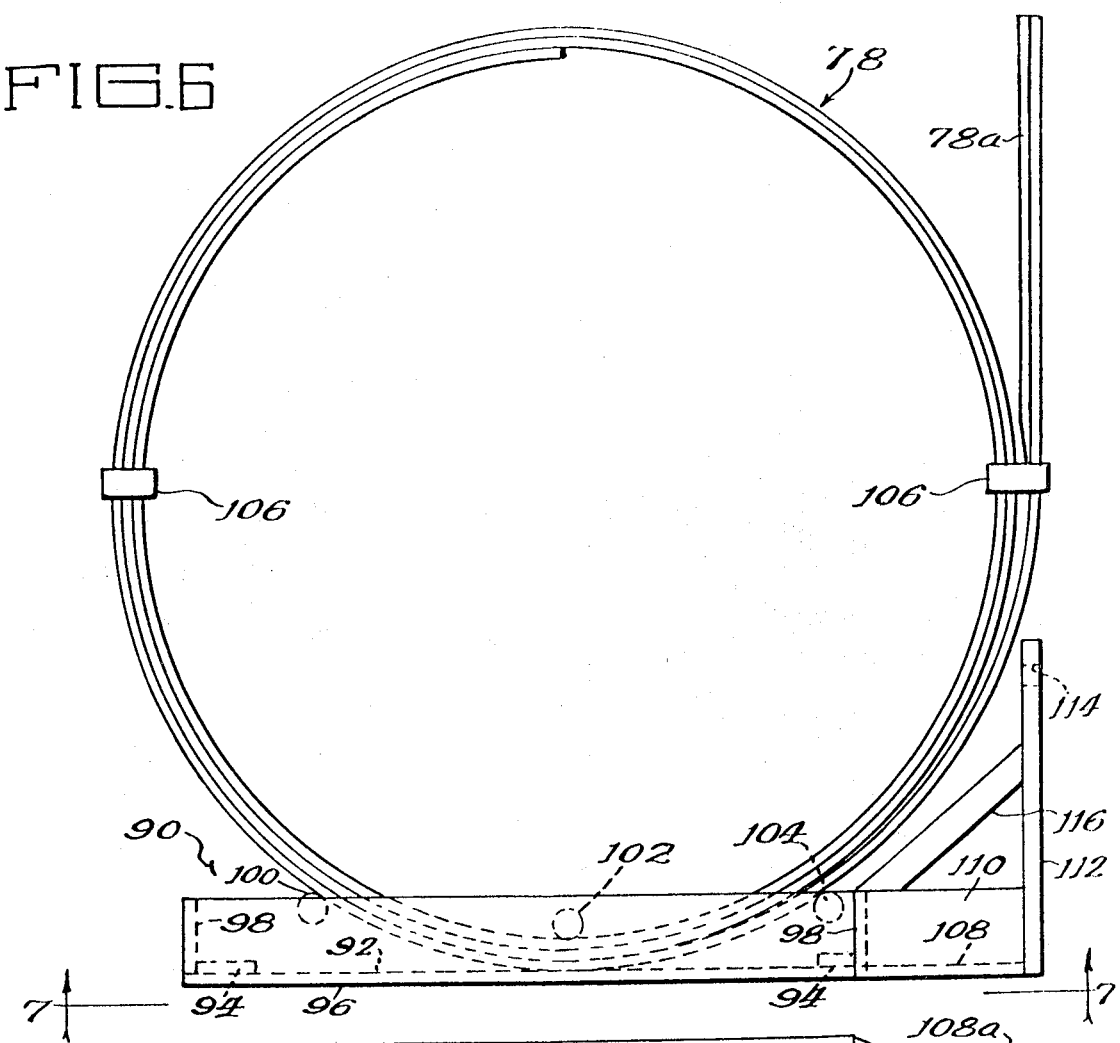
FIG. 6 is an enlarged side elevational view of a coiled side wall stave member mounted upon a carrying cradle.

While this invention is susceptible of embodiment in many different forms, there is shown in the drawings and will herein be described in detail several embodiments of the invention, with the understanding that the present disclosure is to be considered as an exemplification of the principles of the invention and is not intended to limit the invention to the embodiments illustrated. The scope of the invention will be pointed out in the appended claims.

I. The Silo Structure Generally

Referring now to the drawings in detail, the silo of the present invention is illustrated in its entirety by reference numeral 50 in FIG. 1, and is seen to include a base 52, wall structure 54, and roof structure 56. The methods and structures of the present invention will be described in connection with a silo that is 24 ft. in diameter and 70 ft. high, although it will be appreciated that the principles of the invention will apply to both larger and smaller silo structures.

A. The Silo Base

As best seen in FIGS. 2 and 3, base 52 is a generally cylindrical concrete member that extends about 4 ft. above grade. Base 52 is preferably provided with a passage 58 that opens to one side to afford access to a bottom silo unloader; and base 52 further includes a central opening 60 for reception of internal staging, as will hereafter appear. A plurality of circumferentially spaced, generally L-shaped arcuate angle members 62 are provided around the periphery of base 52, and an inwardly directed flange 64 of each member 62 is secured to the base 52 by suitable fasteners 66. The arcuate, vertically extending flange 68 of each member 62 is positioned in substantial alignment with the outer periphery of base 52, and each portion 68 is provided with a plurality of openings 70 (FIG. 2) for reception of fasteners to secure the lower end of the wall stave members to be subsequently described. A plurality of spaced sets of anchors 72 are provided around base 52 below the upper end thereof, and each anchor 72 includes an internally threaded bore 74 (FIG. 44) which may receive bolt 76 to removably secure wall stave holding cradles to the base, as will hereinafter appear. Base 52 is provided with a plurality of circumferentially spaced, vertically extending cored out recesses 73 in the outer face thereof to facilitate insertion of filler members between the wall stave members during erection of the silo side wall structure, as will hereinafter appear. Nineteen 4 ft. wide staves are needed for a 24 ft. diameter silo, so that 19 recesses 73 are required for the vertical joints between adjacent staves.

B. The Wall and Roof

Wall structure 54 is defined by a plurality of identically shaped stave members 78, each having a length substantially equal to the height of the structure. Staves 78 may be formed of sheet materials such as steel, aluminum, plastic reinforced with glass fibers or the like; and the staves may be transversely precurved during manufacture (FIG. 5). Even if flat, they are stressed to a curved shape when assembled and compressed by circumferential bands, so that in either case they form a substantially cylindrical enclosure. The upright portions 68 of members 62 may be secured to the concrete form when the base 52 is poured, so they are firmly embedded in the base and have their faces flush with its upright surface. Each stave 78 has a line of openings 80 (FIG. 4) across its lower end that is positioned in alignment with the openings 70 in angle member portions 68, so that bolts 81 (FIG. 1) impaling the aligned openings may positively secure the staves to the base. Minor variations in stave length are accommodated by letting the lower ends of the staves extend over the side of the base if necessary. A line of openings 82 is provided across the upper end of each stave member 78 to receive fasteners for securing the roof structure 56 to the stave members.

The present invention contemplates that any suitable form of roof structure 56 may be used; and in the illustrated embodiments the roof structure 56 is shown to comprise a plurality of segments 84 secured to one another, with flanges 86 at the lower ends of the segments 84 embracing the outer periphery of the stave members 78 and having openings (not shown) aligned with the openings 82 in the stave members, so that fasteners 88 can pass through the aligned openings and positively secure the roof structure 56 to the wall structure 54.

The present invention contemplates that the silo 50 will be effectively sealed to prevent putrefaction and resultant spoilage of silage; and to this end, filler member illustrated in FIGS. 11-26 may be secured between adjacent stave members, or the adjacent stave members may be secured to one another without the interposition of additional filler members, as disclosed in my copending application, Ser. No. 684,366, filed Nov. 20, 1967. A plurality of vertically spaced steel bands 89 extend circumferentially around the staves and filler members; and each band is drawn tight to apply a compressive force to the silo side wall structure. Conveniently the bands may be similar to those used for banding packages, pipe, lumber and general cargo so that common banding equipment may be used to tension each band and fasten its ends together.

II. The Staves and Coil Cradles

Figure 7:
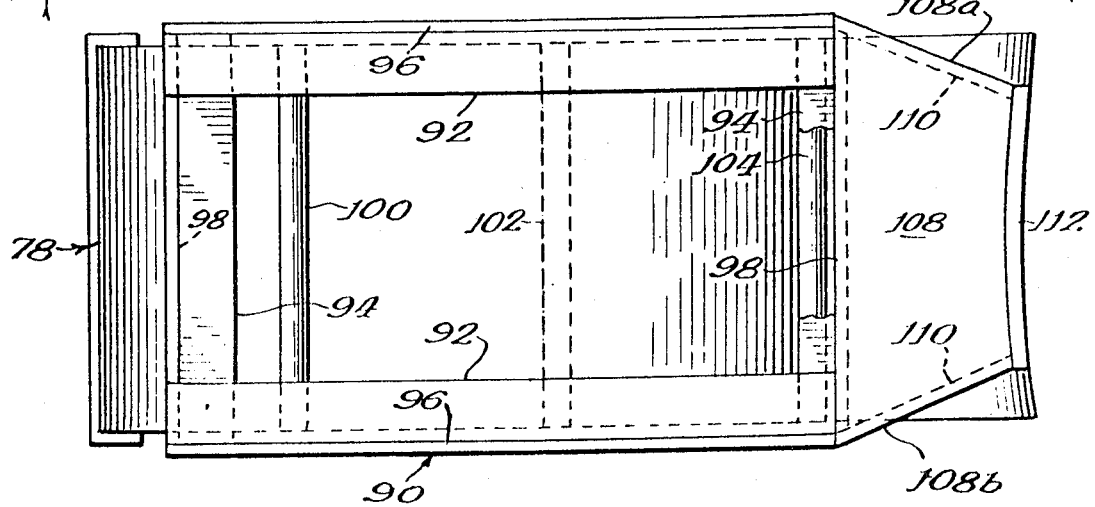
FIG. 7 is a bottom plan view taken generally along line 7—7 of FIG. 6.
Figure 27:
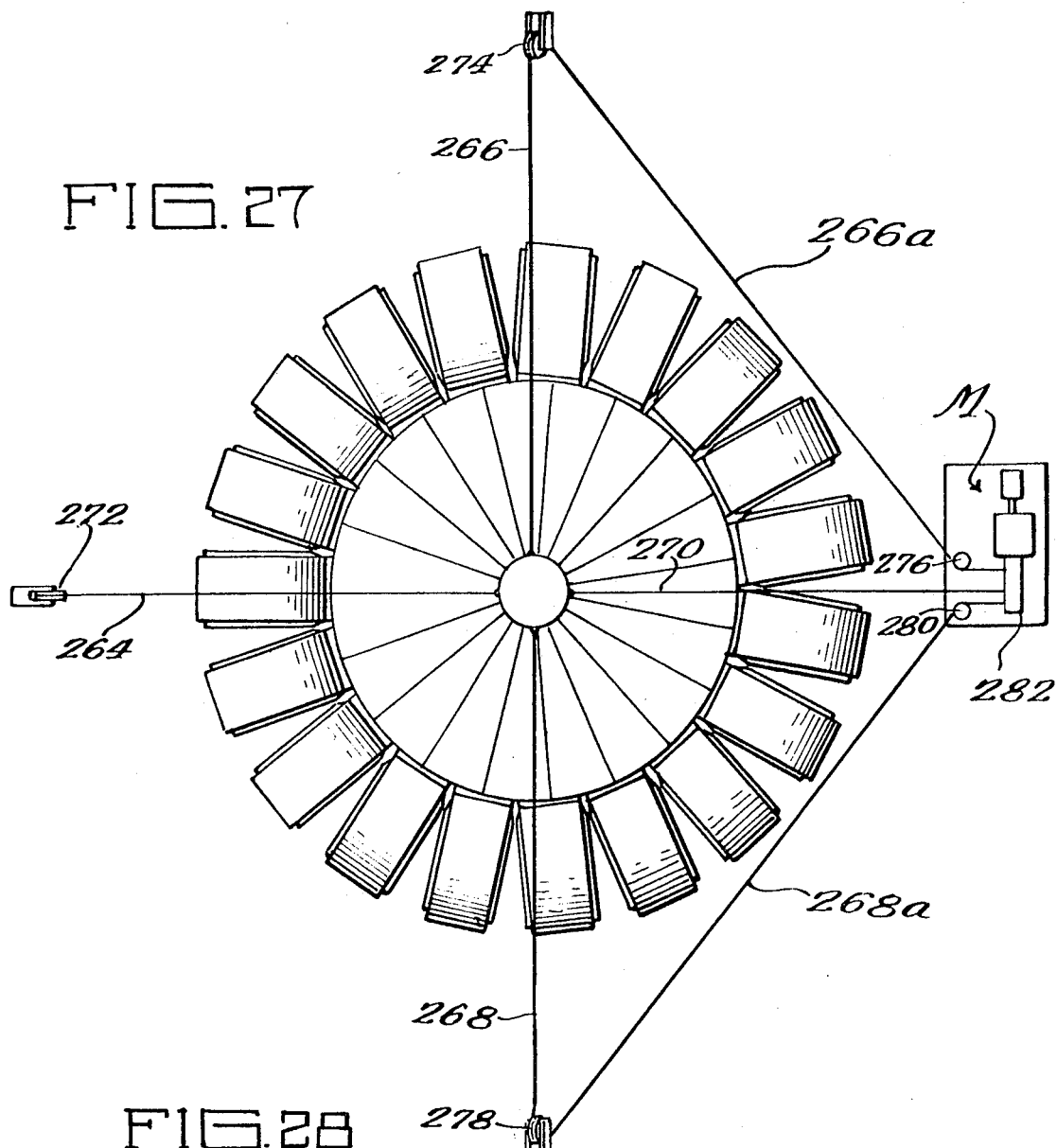
FIG. 27 is a plan view.
Figure 28:
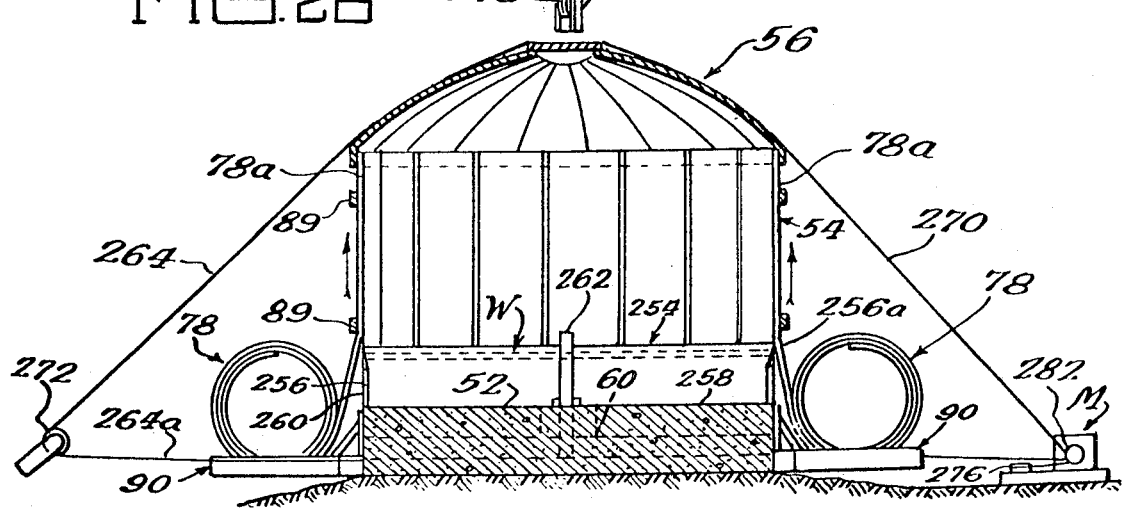
FIG. 28 is a central sectional view of a silo structure with the angle members omitted for clarity, and illustrating a first method for elevating the side wall staves.
Figure 31:
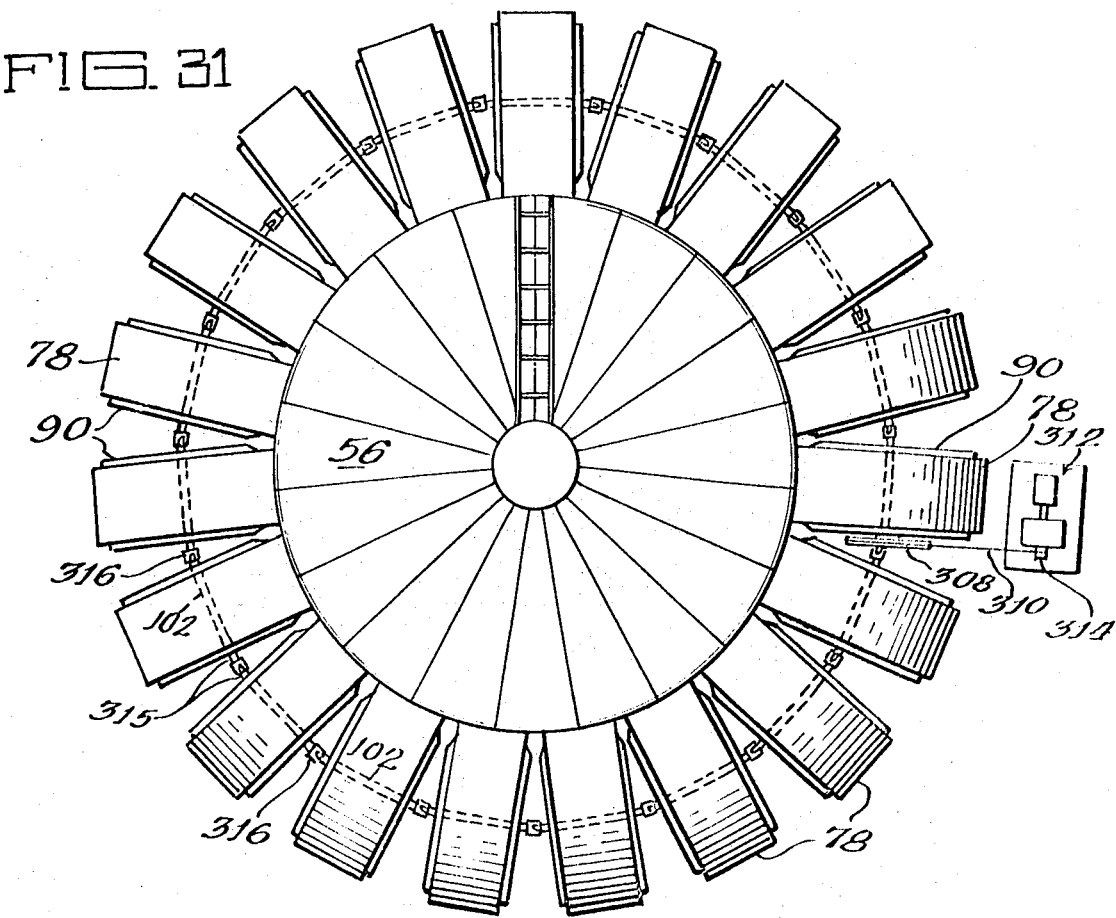
FIG. 31 is a plan view.
Figure 32:
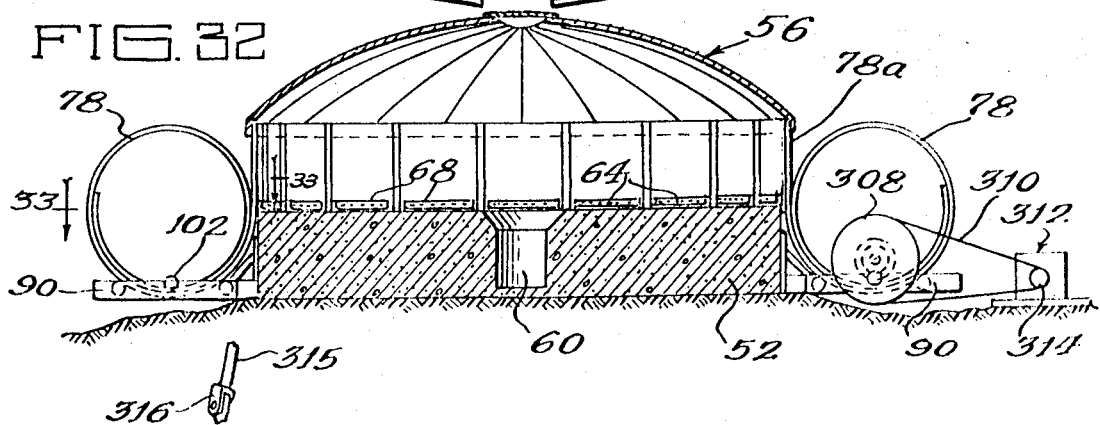
FIG. 32 is a central sectional view of a silo structure, and illustrating a still further method of elevating the side wall staves.
Figure 33:
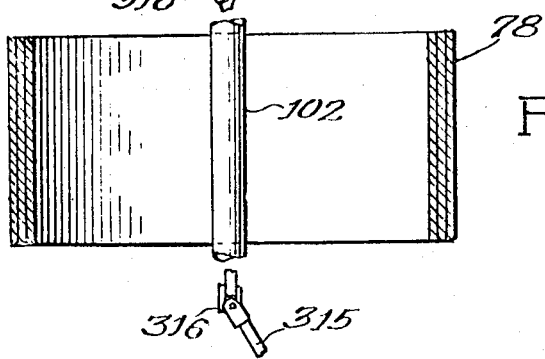
FIG. 33 is an enlarged sectional view taken generally along line 33—33 of FIG. 32.

The stave members, either transversely precurved or flat, are coiled as illustrated in FIGS. 6 and 7 upon a suitable cradle assembly 90. Cradles 90 are defined by a frame structure including a pair of spaced elongate frame members 92 that are joined at opposite ends by transversely extending members 94. Further, frame members 96 extend upwardly from the outer edges of frame members 92, and transverse frame members 98 extend between upright frame members 96 at opposite ends thereof. Spaced rolls 100, 102 and 104 extend between frame members 96, and as is best seen in FIG. 6, the convolutions of coiled staves 78 are wound beneath central roll 102 and rest upon outer rolls 100 and 104. Straps 106 are secured around the coiled stave members and retain them in a coiled condition, with a free end 78a of the stave member extending upwardly from strap 106.

Cradles 90 include means for removably supporting the same upon the silo base 52, and to this end, a frame member 108 is secured to frame member 98 and extends outwardly of frame members 92 and forwardmost frame member 94. The sides of frame member 108 are inclined as shown at 108a and 108b in FIG. 7, so that the cradle assemblies 90 may be assembled around the silo base without interfering with one another. Converging frame members 110 extend upwardly from the edges 108a and 108b of member 108, and are secured to frame members 98 and a mounting frame member 112 at the forward edge of member 108. Mounting frame member 112 has a curvature corresponding substantially to the curvature of silo base 52, so as to fit substantially flush against the outer periphery of the silo base; and a plurality of openings 114 (FIG. 6) are provided in the upper end of mounting member 112 to be positioned in registry with the threaded openings 74 in anchors 72, so that the bolts 76 may removably secure the cradles to the silo base. One or more strengthening braces 116 may extend between mounting member 112 and transverse member 98.

III. Filler Members

A. First Form of Filler: H-Shaped

A first form of the filler member 120 to be inserted between each adjacent pair of stave members will be best understood from FIGS. 11-13; and as is seen in FIG. 13, filler member 120 is generally H-shaped in cross section and includes a central portion 122 having transverse flanges 124 at its end which cooperate with the central portion to define oppositely facing notches or openings 126. Each flange 124 has a curved outer face 124a, and a plurality of vertically spaced recesses 128 are provided in the face 124a to receive the bands 89. An adhesive and sealing material 130 is provided on both faces of central portion 122 to positively secure and seal the filler member to the opposed facing edges of adjacent stave members 78. The upper end of each filler member 120 is preferably rounded, as shown at 120a, and the lower end of each filler member 120 is preferably provided with a rounded recess 120b which receives the rounded-upper end 120a of a vertically abutting filler member 120 therein to nest the filler members together and center them with respect to one another. Filler member surfaces 120b are also preferably provided with an adhesive sealing substance to positively seal abutting filler members to one another and insure a sealed silo structure. In an illustrative embodiment of the invention, wherein the stave members 78 are approximately one-fourth inch in thickness, filler members 120 are approximately 1 inch in effective diameter, and the notches 126 are approximately one-fourth inch in width. The filler members 120 may be approximately 30 inches long, so that 28 filler members will be required between each pair of adjacent stave members for a 70 ft. silo. The recesses 128 extend approximately one-eighth inch inwardly of the outer periphery of the filler members and are approximately 2 ¼ inches long. The filler members are preferably formed of a somewhat flexible material such as plastic reinforced with glass fibers although aluminum and steel are also satisfactory. The invention also contemplates a single filler member 120, having a length substantially equal to the height of the structure, which may be provided between adjacent staves 78; and in this instance, the filler members would be coiled in a manner similar to staves 78 to facilitate storage, transportation, and assembly.

1. Modified H-Shape with Reinforcing Discs

A further form of filler member 140 is illustrated in FIGS. 14 and 15, and filler member 140 is shaped generally the same as filler member 120 except that the notches 146 between flanges 144 are tapered to facilitate insertion of the filler members 140 between adjacent stave members. The filler member 140 is adapted to be formed from a flexible plastic material, such as plastic reinforced with glass fibers; and generally hexagonal metal reinforcing discs 150 (FIG. 15) are provided at suitably spaced intervals throughout the length of each filler member. Discs 150 have notches 151 at their opposite sides so that the discs are generally H-shaped, with a central portion 152 of the discs extending across the central portion of the filler member 140, and transverse flanges 153 of the discs extending across the flanges 144 of the filler member. The sides of notches 151 are tapered, so as to be disposed in alignment with the sides of the longitudinal grooves 146 in the filler members. Discs 150 are preferably stamped from sheet stock, and the H-shaped configuration is provided by pressing oppositely extending arrowhead shaped tabs 154 and 155 outwardly from the plane of disc 150. Triangularly shaped openings are formed in the flanges 153 of the disc 150 by pressing oppositely extending triangularly shaped tabs 156 and 157 outwardly from the plane of disc 150, and tabs 154–157 cooperate to serve as reinforcing ties in the plastic material. It should be understood, of course, that the discs 150 are spaced sufficiently from one another so that the filler member 140 is somewhat flexible to facilitate coiling of the filler members and insertion thereof between adjacent staves 78.

2. Alternate Forms of Reinforcing Discs for H-Shaped Filler

Further forms of reinforcing discs are illustrated in FIGS. 16–22. The insert disc embodiments of FIGS. 16–22 are all similar to the insert disc embodiment of FIGS. 14 and 15, so that similar reference numerals have been used to indicate corresponding elements, with the reference numerals of the embodiment of FIGS. 16 and 17 being primed, the reference numerals of the embodiment of FIGS. 18 and 19 being double primed, and the reference numerals of the embodiment of FIGS. 20 and 21 being triple primed. The insert disc 150' of FIGS. 16 and 17 is substantially the same as that of FIGS. 14 and 15 except that the notches 151' in opposite sides of the disc have parallel sides, rather than inclined sides as in the embodiment of FIGS. 14 and 15. The insert disc 150' is to be used in flexible material such as plastic, or the like, that is shaped as shown in FIG. 13 wherein the sides of the longitudinal grooves 126 are parallel to one another. In the insert disc 150''', illustrated in FIGS. 20 and 21, the upwardly and downwardly extending tabs 154''' and 155''' are struck from the sides of the openings 151''' in opposite sides of the insert disc, so that the oppositely extending tabs 154''' and 155''' are laterally offset from and parallel with one another. In the insert disc 150'', illustrated in FIGS. 18 and 19, upwardly and downwardly extending tabs 154a'' and 155a'' and 154b'' and 155b'' are provided at opposite sides of each notch 151'', with the oppositely extending tabs being positioned in laterally spaced parallel relationship with one another. Each of the insert discs 150, 150', 150'', and 150''' may have the edge thereof serrated, as shown at 159 in FIG. 22, to enlarge the area of contact between the insert discs and the material of the filler members.

B. Second Form of Filler: T-Shape

Turning now to FIGS. 23 and 24, a further form of filler member 160 is illustrated therein which is generally T-shaped in cross section and which includes an upright portion 162 and a generally semi-cylindrical transversely extending head portion 164 having a rounded outer surface 164a. Head portion 164 has substantially flat surfaces 164b and 164c at opposite sides of upright portion 162 which are positioned in face abutting engagement with the inner surfaces alongside the upright edges of adjacent stave members 78, while the upright portion 162 of filler member 160 extends between the edges of adjacent stave members 78 and has faces 162a and 162b abutting said edges. A plurality of openings 166, one of which is shown in FIG. 23, are provided in the upright portion 162 of filler member 160 immediately outside the front surfaces of the stave members. The openings 166 in the filler members 160 are horizontally aligned to receive the compressive bands 89. As with the filler members 120 and 140, filler members 160 may be in short lengths, or may have a length corresponding to the height of the structure and may be coiled in a manner similar to the staves illustrated in FIGS. 6 and 7.

C. Third Form of Filler: Hybrid H-Shape and T-Shape

A portion of the filler member 170, illustrated in FIGS. 25 and 26, is shaped somewhat similarly to the embodiment shown in FIGS. 23 and 24, in that a portion of the filler member 170 is generally T-shaped in cross section, and includes an upright portion 172 and a generally semi-cylindrical transversely extending head portion 174. Head portion 174 includes elongate surfaces 174b and 174c at opposite sides of upright portion 172, and surfaces 174b and 174c are adapted to be positioned in face abutting engagement with the inner surfaces alongside the edges of adjacent stave members 78. Upright portion 172 has a length corresponding substantially to the thickness of stave members 78, so that the outer surface 172a of portion 172 is positioned substantially flush with the outer surfaces of stave members 78. Vertically spaced, generally semi-cylindrical enlargements 176 are formed integrally with filler member 170, and enlargements 176 each include a curved outer surface 176a, and flat inner surfaces 176b and 176c at opposite sides of upright portion 172. Surfaces 176b and 176c are positioned in spaced, generally parallel relationship to surfaces 174b and 174c, respectively, and said four surfaces cooperate with surfaces 172b and 172c to define laterally open stave receiving notches 178. Surfaces 172b and 172c are adapted to be positioned in face abutting engagement with the outer surfaces alongside the edges of adjacent stave members 78; and surfaces 174b, 174c, 176b and 176c, as well as the laterally outwardly facing sides of upright portion 172, may be provided with a suitable adhesive substance to create a sealed connection between the filler member 170, and the adjacent stave members 78. The major portion of the filler member 170, at the enlargements 176, is generally H-shaped in cross section like the embodiment of FIGS. 11–13, while the remainder of the filler member 170 is T-shaped in cross section like the filler member of FIGS. 23 and 24. The enlargements 176 preferably have inclined ends 180, so as to provide guide surfaces for facilitating the insertion of bands 89 therebetween, it being understood that the enlargements 176 on the filler members are aligned so as to collectively define band receiving notches therebetween.

IV. Assembly — Generally

To assemble a silo structure as illustrated in FIG. 1, a plurality of coil cradles 90 are positioned around the periphery of base 52, with the holes 114 in the upright portions 112 of the coil cradles positioned in registry with the openings 74 in the anchors 72, so that bolts 76 may be inserted through the aligned openings to removably mount the coil cradles upon the base 52. As is clear from FIGS. 8 and 9, when the coil cradles 90 are in place, the free ends 78a of the coiled staves 78 are positioned in a common horizontal plane. After the coil cradles 90 are in place, roof structure 56 is positioned on the upstanding ends 78a of the coiled stave members, and the roof structure is secured thereto by fasteners 88, as is shown in FIG. 10. If the 2 ½ ft. filler member sections are to be used, a first row of such sections is slid between the upstanding ends 78a of adjacent stave members by placing the filler member section in one of the cored recesses 73 in the outer surface of base 52, and sliding the filler member upwardly until its upper end abuts roof structure 56, or is positioned in alignment with the upper end of the stave members. In FIG. 10, a plurality of short length filler members 120 are illustrated between the free ends 78a of the stave members. If continuous filler members having the same length as the height of the structure side wall are to be used, each filler member is coiled and mounted upon a cradle structure (similar to stave cradles 90) and mounted on the silo base 52, with the free ends of the filler members interposed between ad-jacent stave members. The partially assembled silo structure is then elevated by incrementally applying an upward force to the structure, and compressive bands 89 are secured around the wall structure at vertically spaced positions after each increment of force is applied.

A. First Means for Applying Incremental Force — Pneumatic

A first means for applying an incremental force to the partially assembled structure of FIG. 10 is illustrated in FIGS. 34 and 35, and the arrangement of FIGS. 34 and 35 takes advantage of the fact that the silo side wall structure 54 is effectively sealed above the base 52, once the filler members have been inserted. To this end, an upwardly open vessel 254, having an upright side wall 256 and a bottom wall 258, is positioned on the upper surface of base 52 and filled with water W. A band 260 extends around the wall 256 to retain it upright, and to minimize the area of contact between the silo staves 78 and the side wall 256 during elevation of the silo staves. As is clear from FIG. 35, only the upper portion 256a of side wall 256 engages the staves 78, so that the frictional drag of the side wall 256 upon the staves 78 during elevation is minimized, and wearing of the side wall 256 is reduced. Air under pressure is incrementally applied to the interior of the structure through a central tube 262, and after each increment, a compressive band 89 is secured around the circumference of the wall structure.

In the exemplary embodiment of the invention, wherein the diameter of base 52 is 24 ft., base 52 has an approximate area of 65,000 square inches. With a side wall structure formed of steel, the weight of the structure to be elevated is less than 60,000 lbs.; (and is much less for structures formed of aluminum or plastic reinforced with glass fibers), so that a pressure of less than 1 lb. per square inch is sufficient to elevate the silo structure. In order to stabilize the structure as it is elevated, four cables 264, 266, 268 and 270 are attached at 90° increments around the crown of the roof structure 56, and each of the cables is connected to a common winch drum 282, driven by a motor unit M. Cable 264 is trained over a vertically arranged ground pulley 272, and cable 264 includes a horizontally disposed portion 264a that extends through a diametric passage in the base 52 for connection to drum 282. Cables 266 and 268 are trained over respective ground pulleys 274 and 278 that are inclined toward drum 282, and cables 266 and 268 include horizontal portions 266a and 268a that are trained over horizontally disposed pulleys 276 and 280 for guidance of the cables onto the drum 282. As is seen in FIG. 35, cable 270 extends directly downwardly from the roof crown structure to the drum 282. With the cable stabilizing system, an air pressure in excess of that required to lift the silo structure can be tolerated, and the silo will rise only as rapidly as the cables are reeled off of the drum 282. Thus, the air under pressure may be constantly applied through pipe 262, and the motor means M may be periodically braked to allow the vertically spaced bands 89 to be applied.

Once the staves 78 have been completely uncoiled, suitable fasteners 81 may be inserted and secured in the aligned openings 80 and 70 in the staves 78 and the angle members 62, respectively, to positively secure the lower ends of the stave members to the silo base. The cradle assemblies 90 are then removed, and the cables 264, 266, 268 and 270 are disconnected to complete the erection process. The attachment of ancillary equipment, such as ladders, valves, hatches, etc. preferably takes place as the structure is elevated, but this equipment may be applied after the structure is completely elevated, if desired. In any event, it will be appreciated that substantially all of the manual labor may take place at ground level, and that the conventional costly and clumsy staging equipment is eliminated.

B. Second Means for Applying Incremental Force—Plural Hydraulic Jacks

In the arrangement illustrated in FIGS. 36 and 37, a plurality of pairs of holes 284 are punched in vertically spaced, offset relation in each of stave members 78, and lifting blocks 286 are secured to a plurality (but not necessarily all) of staves 78 by fasteners 288 which impale openings 284 in the staves and openings 290 in the lifting blocks. Each lifting block 286 has an upright surface 292 in face abutting engagement with the inner surface of a stave 78, an abutment portion 294 extending at right angles with respect to upright portion 292, and upright webs 296. The undersurface of each lifting block portion 294 is adapted to be engaged by the ram 298 of a jack 300, and the jacks 300 are preferably connected to a common source of fluid under pressure 302 by lines 304. Suitable valve means (not shown) are provided for incrementally admitting fluid under pressure to jacks 300 to extend rams 298 and elevate the silo side wall structure. In the arrangement illustrated in FIGS. 36 and 37, the filler members between the adjacent staves 78 are coiled in a manner similar to the coiling of staves 78, so that when the staves are lifted, the filler members will wedge against adjacent stave members, so that the filler members and staves to which lifting blocks 286 are not secured will be lifted by a wedging action along with the staves 78 that are positively lifted. After each increment of lifting force is applied, a compressive band 89 is secured around the periphery of the partially elevated side wall structure, and a plurality of jacks 300a are placed in engagement with a series of lower lifting blocks 286a to support the partially elevated silo structure. The uppermost lifting blocks 286 are then removed, and the holes 284 in the staves 78 are sealed, as by placing a round head bolt in the holes 284 and securing a nut to the outer end thereof. The rams 298a of the lower jacks 300a are then actuated, and the procedure is repeated until the silo structure is fully elevated, at which time the lower ends of the staves 78 are secured to the angle members 62 and the cradle assemblies for the staves and filler members are removed. It will be understood, of course, that a stabilizing system similar to that illustrated in FIGS. 34 and 35 may be utilized in connection with the arrangement illustrated in FIGS. 36 and 37, if desired.

C. Third Means for Applying Incremental Force—Unwinding of Staves

In the embodiment of FIGS. 38–40, the central roller 102 of one of the coil cradle assemblies 90 has a sprocket 308 fixed to one of its ends, and a chain 310 is trained over sprocket 308 and over a further sprocket 314 fixed to the output shaft of a motor and reduction gear box 312. Drive shafts 315 are directly coupled to the central roller 102 of each coil cradle, and drive shafts 315 are connected to one another by universal joints 316, so that rotation of sprocket 308 will cause each of the coiled stave members 78 to unwind. It will be understood, of course, that any of the rollers 100, 102 or 104, or combinations thereof, may be powered and that the tendency of the coil staves 78 to revert to a straight line configuration will keep the staves in contact with all of the rollers for positive driving thereof. Suitable control means, not shown, are provided for intermittently operating motor 312, such that the silo side wall will be elevated in step-by-step fashion, with the compressive bands 89' being applied after each increment of rotation of motor 312. As with the earlier embodiment, cable support means may be provided to stabilize the silo structure during elevation, and the filler members to be inserted between the staves 78 may be coiled and have the same length as the staves 78, or may be short sections that are inserted between the staves after each lifting increment is applied. Since the end of the stave will pass the driven roll 102 of the powered coil cradle prior to the full elevation of the silo side wall structure, it is necessary that a jack arrangement, similar to that illustrated in FIGS. 37 and 37, be utilized to apply the last increment of lifting force.

Alternatively the staves 78 may be so prestressed that they tend to uncoil themselves, in a reverse action to that commonly found in steel measuring tapes which retract themselves within a casing. In that case the motor 312 may be omitted, and a releasable brake means may be used to permit the staves to extend themselves incrementally when the brake is released.

D. Fourth Means for Applying Incremental Force — Single Hydraulic Jack and Extensible Frames In the embodiment of FIGS. 41–43, a single jack 318 is positioned in the central well 60 of base 52, and is connected by a line 320 to a suitable source of fluid under pressure for incrementally reciprocating the ram 322 of jack 318. A tripod assembly 324 is positioned centrally on base 52, and the tripod assembly includes an annular support 326 resting upon the upper surface of base 52, upwardly extending inclined legs 328, and a cylindrical collar 330. A central column 331 is adapted to be lifted by jack 318 and apply an upward lifting force to the roof structure 56 of the silo through a spider assembly 332. Spider assembly 332 includes a plurality of inclined arms 334 that extend outwardly from a central hub 336, and hub 336 is adapted to be supported by the central column 331. Column 331 is formed of a plurality of individual sections 338, each having an opening 349 therein. The ram 322 of jack 318 has a stroke sufficient to position an opening (not shown) in each section 338 above the collar 330 of tripod assembly 324, so that a pin 342 may be removably inserted in the opening to temporarily support the section 338 upon the collar 330 of the tripod assembly. The pins 342 may be withdrawn after each additional column section 338 is elevated by the jack 318.

Means is provided for stabilizing the central column as it is elevated, and such means includes a plurality of tubular stabilizing members 344 that extend radially outwardly from the central column 331, and at the ends of which are pads 346 that bear on the wall structure 54 as the members 344 are supported by chain or cable supports 348 secured to the spider assembly 332. Column sections 338 are provided with a series of transverse holes 349 (FIG. 42) to removably mount the stabilizing members 344 upon the column 331, and to this end, a generally L-shaped member 350 is secured to the inner end of each member 344, with the shank of each member 350 impaling an opening 349, and the hooked end portion 352 of member 350 being positioned inwardly of the column section 338. Braces 354 (FIG. 43) preferably extend between each of the stabilizing members 344 to retain them in proper spaced relation. It will be understood that each stroke of jack 318 will lift the roof structure 56 a predetermined amount, and the staves will be pulled up by this action. Coiled filler members are preferably used with the embodiments of FIGS. 41–43, and the filler members are also pulled up with the staves 78 by a wedging action therebetween. When the wall structure 54 is fully elevated, the internal staging is removed and the lower ends of the staves 78 are secured to the angle members 62. The circumferential bands, once they are tightened, will cause the partially elevated cylindrical structure to have self supporting structural integrity, even though the lower ends of the staves are unconnected, and the banded staves serve to retain the column 331 in a substantially straight line relationship. An external cable system, similar to that illustrated in FIGS. 34 and 35, may also be provided to further stabilize the structure.

One of the major advantages of the silo structure and process of the present invention is that the stave members 78 when coiled and mounted on the coil cradles 90 as illustrated in FIG. 6, can be conveniently stored and transported. For example, twelve 8' diameter coils, each in its own cradle 90, can be loaded side by side lengthwise of a 50' semi-trailer, and this convenient transportation arrangement will not violate the truck and weight limitations of any of the states in the U.S. Furthermore, it has been determined that stave members of a limber sheet material, such as metal, or plastic reinforced with glass fibers, one-fourth inch or five-sixteenths inch thick, can be coiled to an 8' diameter without imparting any substantial set to the stave members when they are uncoiled.

As a modification of the powered roller erection method illustrated in FIGS. 38–40, it is contemplated that the use of jacks, or the like, to apply the last increment of lift force may be eliminated. To this end, the vertical arcuate member 112 of the coil cradle 90 (FIGS. 6 and 7) may include two fairly widely spaced vertical legs, which would allow a tail of reduced width at the end of the coiled stave 78 to be received between the vertical legs of member 112, while the tail is still in engagement with the powered roller. In this arrangement, after the staves are elevated to the desired height and are fixed in place, the stave tails would extend below the upper surface of base 52, and would embrace the outer periphery of the base. The tail end of the staves could either be tapered, or could be stepped directly to a reduced width, it being understood that the contemplated tail is long enough to allow the staves to be elevated to their full height to position the openings 80 in alignment with the openings 70 in the angles 68. The tail of the modified stave members could also be provided with openings, and anchors, such as anchors 72, could be provided in the base 52 to receive fasteners, such as bolts 76, to secure the stave tails to the base adjacent to grade line.

We claim:

1. The method of constructing a permanent storage structure comprising the steps of:
   a. providing a fixed, permanent base;
   b. assembling a plurality of long, narrow wall staves around the perimeter of said base with their lateral edges in juxtaposition with one another so that they surround the base, each of said staves being coiled about a transverse axis so as to occupy a generally cylindrical space;
   c. partially uncoiling said staves so that a free end of each of said staves extends vertically upwardly and terminates in a common horizontal plane with the free ends of the other staves;
   d. assembling a roof structure on the free ends of said staves to secure said free ends together;
   e. applying an upward force to the coiled staves to simultaneously unroll said staves thereby elevating the free ends of said staves and said roof; and
   f. securing the lower ends of said staves permanently to said base.

2. The method of claim 1 which includes the step of transversely precurving said staves prior to their assembly around the structure base.

3. The method of claim 1 in which said upward force is incrementally applied, and including the steps of securing a compressive member around the perimeter of said staves after each force increment.

4. The method of claim 1 wherein said upward force is applied by driving the coil of at least one of said coiled staves, with the non-driven coils being coupled to the driven coil so that all of said staves are elevated simultaneously.

5. The method of claim 1 in which said upward force is applied to said roof structure.

6. The method of claim 5 including the step of erecting a tower above said base inwardly of said staves, and applying said upward force to said roof structure from said tower.

7. The method of claim 5 including maintaining said base, staves, and roof structure in a substantially sealed condition, and applying said upward force to said roof structure by introducing fluid under pressure beneath said roof structure.

8. The method of claim 1 including the step of sealing a filler member between each pair of adjacent staves as the staves are elevated.

9. The method of claim 8 in which the filler members are precoiled and assembled around the perimeter of the base between the coiled staves, and are elevated continuously with the staves.

10. The method of claim 8 in which the filler members are in short segments, the upward force is incrementally applied, and a segment is inserted between adjacent staves in conjunction with each incremental application of force.

11. The method of claim 8 in which the filler members are hollow, and a setting flowable material is injected into the filler members after they are assembled with the staves.

12. The method of constructing a permanent storage structure comprising the steps of:
   a. providing a fixed, permanent base;
   b. assembling a plurality of long, narrow transversely precurved wall staves around the perimeter of said base with their lateral edges in juxtaposition with one another so that they surround the base, each of said staves being coiled about a transverse axis so as to occupy a generally cylindrical space;
   c. partially uncoiling said staves so that a free end of each stave extends vertically upwardly and terminates in a common horizontal plane with the free ends of the other staves;
   d. assembling a plurality of coiled filler members around the perimeter of said base, one filler member being provided between each two adjacent staves;

e. inserting the free end of each filler member between the free ends of adjacent staves;
f. securing a compressive member around the perimeter of said staves and filler members;
g. assembling a roof structure to the free ends of said staves;
h. incrementally applying an upward force to the assembled structure to unroll the coiled staves and filler members thereby elevating the free ends of said staves, filler members and roof structure;
i. securing additional compressive members around the perimeter of said staves and filler members at vertically spaced positions after each increment of upward force is applied; and
j. securing the lower ends of said staves permanently to said base.

* * * * *